United States Patent [19]
Terada et al.

[11] 3,984,970
[45] Oct. 12, 1976

[54] METHOD AND APPARATUS FOR MANUFACTURING HELICALLY COILED COUPLING ELEMENTS FOR SLIDE FASTENERS

[75] Inventors: Fumio Terada; Shigenori Omori; Kihei Takahashi; Hiroshi Ida, all of Uozu, Japan

[73] Assignee: Yoshida Kogyo Kabushiki Kaisha, Japan

[22] Filed: Aug. 27, 1975

[21] Appl. No.: 608,022

[30] Foreign Application Priority Data

Sept. 5, 1974  Japan............................. 49-102232
Sept. 5, 1974  Japan............................. 49-102233
Sept. 5, 1974  Japan............................. 49-102236

[52] U.S. Cl. ............................... 57/1 R; 57/34 R; 57/156
[51] Int. Cl.$^2$.......................................... B29D 5/00
[58] Field of Search .................. 57/1 R, 3, 6, 9, 15, 57/34 R, 59, 58.36, 58.38, 156, 160; 18/1, 5

[56] References Cited
UNITED STATES PATENTS

| | | | |
|---|---|---|---|
| 2,907,066 | 10/1959 | Wahl | 57/1 R UX |
| 3,053,288 | 9/1962 | Burbank | 57/13 X |
| 3,145,523 | 8/1964 | Burbank | 57/1 R |
| 3,572,023 | 3/1971 | Galonska | 57/1 R |

*Primary Examiner*—Donald E. Watkins
*Attorney, Agent, or Firm*—Bucknam and Archer

[57] ABSTRACT

A method and apparatus for manufacturing helically coiled coupling elements for slide fasteners. There are provided a filament supply unit, a filament coiling unit, a filament drive unit interposed between the supply unit and the coiling unit, and a tension-applying unit disposed between the drive unit and the coiling unit. As a filament is formed into a fastener element in the form of a continuous helical coil at the filament coiling machine, the filament is unwound from a relatively large bobbin in the supply device and at the same time is rotated about its own axis by a rotor of the supply unit at the same rate and in the same direction as the filament is coiled at the coiling unit to thereby eliminate twists on the filament which would otherwise be produced at the latter unit. The drive unit is also adapted to rotate the filament about its own axis while positivey feeding the filament toward the coiling unit. The tension-applying unit imparts constant tension to the filament and simultaneously equalizes the amount of supply of the filament from the drive unit with the amount of the filament being coiled at the coiling unit.

6 Claims, 4 Drawing Figures

METHOD AND APPARATUS FOR MANUFACTURING HELICALLY COILED COUPLING ELEMENTS FOR SLIDE FASTENERS

BACKGROUND OF THE INVENTION

The present invention relates to methods and apparatus for manufacturing helically coiled continuous coupling elements for a slide fastener.

There have been employed various bobbins for storing an element-forming filamentary material which is unwound as it is fed to and formed by a mandrel into a helical coil structure suitable for a slide fastener. From the standpoint of providing a sufficient inventory of filaments per bobbin to dispense with their frequent replacement during operation and to produce a substantially endless or uninterrupted length of fastener element, it is desirable to use literally large bobbins. However, it has been found extremely difficult to use large capacity bobbins with most prior art apparatus for reasons hereafter set forth. One conventional apparatus included bobbins which are nonrotatably set in place. Although a greater supply of element-forming filament could be achieved simply by increasing the capacity of such nonrotatable bobbin, the filament was prone to get twisted as each individual convolution is formed or otherwise deformed when unwound from the bobbin on account of the latter being held stationarily in place with the results that such surface defects appear in the convolutions of the resulting coiled element. This would further result in deformed coupling heads of the elements and also adversely affect the shape and dimensions of the finished fastener element.

Another prior art apparatus employed a bobbin which is rotatable about the axis of the mandrel in order to remove twists on the filament. According to this proposal, the filament was unwound from the bobbin through a filament guide rotor which rotates synchronously with a guide member on a filament coiling machine. Since the bobbin was rotated at higher speeds than the rotor as the filament was fed, the filament was subjected to irregular tension due to changing inventory of the filament on the bobbin, and hence it became necessary to install additional devices for compensating for such irregular filament tension. This prior art proposal was further complicated by the provision of a suitable device for preventing the filament from being excessively taut at the start of operation of the apparatus. According to still another conventional apparatus, a rotatable type of bobbin is provided substantially at right angles to and arranged to move around the mandrel during withdrawal of the filament. This apparatus however has suffered not only from the above-noted difficulties but also the problem that the use of larger bobbins is prohibited due primarily to excessive centrifugal forces generated by their rotation around the mandrel.

SUMMARY OF THE INVENTION

It is the primary object of the invention to provide a method and apparatus for manufacturing helically coiled continuous fastener elements, which permits of the use of large capacity bobbins for storing an element-forming filament and which can produce coiled fastener elements at increased rate of speed without involving the problem of "twists".

Another object of the invention is to provide a filament supply unit incorporating rotating means which maintains the filament in rotation about its own axis at the same rate and in the same direction as the filament is coiled at a subsequent coiling station.

Still another object of the invention is to provide a filament drive unit which is operatively associated with the filament supply unit in feeding the filament, while in untwisting rotation, to the coiling station.

Yet still another object of the invention is to provide a tension-applying unit which imparts a constant tension to the filament and at the same time equalizes the amount of supply of the filament from the drive unit with the amount of said filament being coiled at the coiling unit, so that uniformly shaped fastener elements are manufactured in the coiling unit.

Other and further objects and advantages of the present invention will become apparent from the following description taken in connection with the accompanying drawings in which like reference numerals or characters refer to like parts throughout the several views.

DESCRIPTION OF THE PREFERRED EMBODIMENTS

Figure 1:
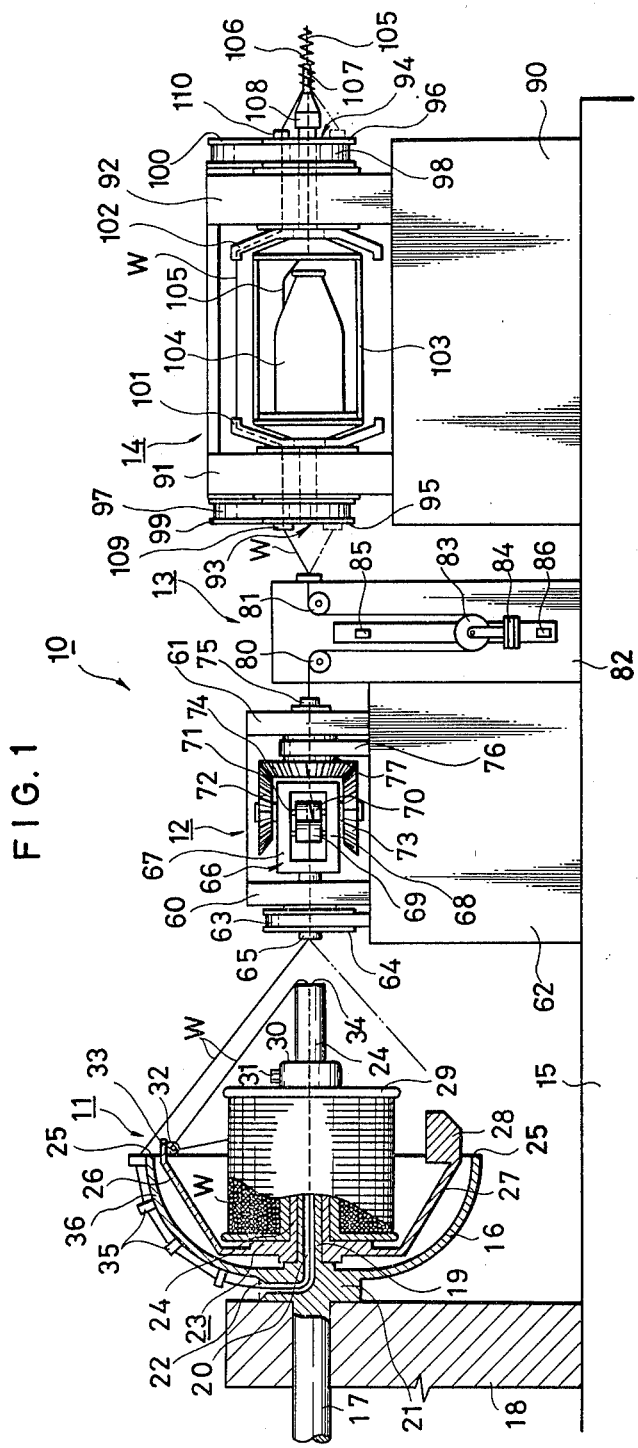
FIG. 1 is a side elevational view of an apparatus constructed in accordance with the invention.

Referring now to FIG. 1, there is shown an apparatus for manufacturing helically coiled continuous fastener elements. The apparatus generally indicated at 10 basically comprises a filament supply unit 11, a filament drive unit 12, a tension-applying unit 13, and a filament coiling unit 14, all these components being arranged in a series on a support bed 15. The filament supply unit 11 includes a cup-shaped rotor 16 having secured thereto a horizontal drive shaft 17 which extends rearwardly and is journaled for rotation in a bracket 18 which is in turn mounted on the bed 15. The cup-shaped rotor 16 is further provided with a supporting shaft 19 which is coaxial with and extends in a direction opposite to the drive shaft 17. Designated at 20 is a passageway formed in and throughout the entire length of the shaft 19 and extending rearwardly into a hub 21 wherein the passageway 20 is open as at 22 behind the rotor 16. The cup-shaped rotor 16 receives substantially therein a filament guiding member 23 which includes a sleeve 24 fitted slidably over the supporting shaft 19 and extending forwardly away from the marginal edge 25 of the cup-shaped rotor 16. A guide arm 26 and a weight arm 27 are connected to the sleeve 24 and extend in opposite directions away from each other toward the marginal edge 25 of the cup-shaped rotor 16. A weight 28 is provided at a free end of the weight arm 27 and serves to support the guiding member 23 nonrotatably on the supporting shaft 19. Rotatably journaled on the sleeve 24 is a bobbin 29 around which has been wound a filament W made of a plastics material. The bobbin 29 is held in place on the sleeve 24 against axial displacement by means of a collar 30 secured to the sleeve 24 by a bolt 31. The filament W unwound from the bobbin 29 is passed through a hole 32 in a projection 33 on a free end of the guide arm 26 toward a free end 34 of the sleeve 24, and thence through the passageway 20, the hub 21, and the guide members 35 on the curved surface 36 of the cup-shaped rotor 16 toward the filament drive unit 12. When the filament W is unwound from the bobbin 29 as it is pulled by the drive unit 12, the bobbin 29 rotates slowly relative to the filament guide member 23 which is held nonrotatable. This arrangement makes it possible to use a large capacity bobbin. An alternative arrangement of the supply unit 11 is to remove the weight 28 from the weight arm 27 to allow the filament guide member 23 to rotate as the filament W is unwound and to attach a weight to the bobbin 29 so that the bobbin 29 is held nonrotatable. Further alternatively, a rod or other suitble member may be mounted eccentrically on the bobbin 29 to render the latter nonrotatable.

Figure 2:
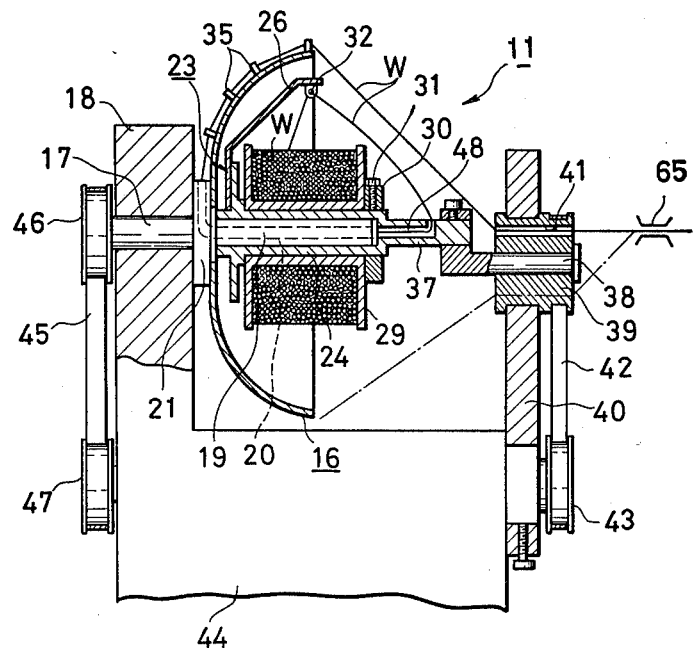
FIG. 2 is a longitudinal cross-sectional view showing another embodiment of a filament supply unit.

FIG. 2 shows a modified form of the filament supply unit 11 wherein the filament guiding member 23 is nonrotatably supported in place by connecting to an extension shaft 37 of the sleeve 24 a spindle 38 which is eccentric with respect to the sleeve 24. The eccentric spindle 38 is supported coaxially in a guide wheel 39 which is rotatable relative to the spindle 38 and journaled for rotation in a frame 40. The guide wheel 39 is provided with a passageway 41 defined eccentrically through and extending axially of the wheel 39 and is adapted to be rotated by a belt 42 running thereover and driven by a pulley 43 powered by a motor, not shown, housed in a base 44. The drive shaft 17 is adapted to be rotated at the same speed as the guide wheel 39 by a belt 45 trained around a pulley 46 attached to a rear end of the drive shaft 17 and driven by a pulley 47 powered by the motor. The filament W delivered from the bobbin 29 is threaded through the hole 32, a passageway 48 in the extension shaft 37, the passageway 20 and the hub 21 and thence through the guide members 35 and the passageway 41 in the guide wheel 39 toward a filament guide which comprises a hollow shaft 65 for the drive unit 12 as seen in FIG. 1. Since the drive shaft 17 and the guide wheel 39 are arranged to revolve at the same speed, the filament W is withdrawn smoothly from the passageway 41 without being interferred by the eccentric spindle 38.

Figure 3:
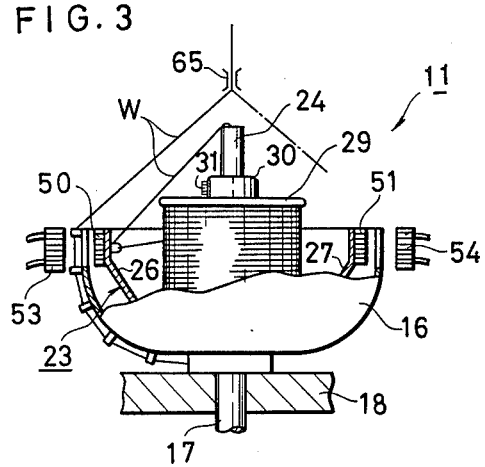
FIG. 3 is an elevational view with parts shown in section illustrating a further embodiment of the filament supply unit.

FIG. 3 illustrates another modification of the filament supply unit 11 in which the filament guiding member 23 is nonrotatably supported by means for example of magnets 50 and 51 mounted on the oppositely disposed guide arms 26 and 27 respectively and normally attracted by the corresponding electromagnets 53 and 54 located in spaced relation on the exterior of the cup-shaped rotor 16.

As seen in FIG. 1, the filament drive unit 12 has a pair of parallel frames 60 and 61 spaced apart longitudinally of the drive unit 12 and secured to a base 62 which is in turn mounted on the bed 15. The base 62 accommodates therein a drive source, not shown, for driving a belt 63 running over a pulley 64 that is keyed to a rear end of the hollow shaft 65 rotatably journaled in the frame 60. Connected to the front end of the shaft 65 and positioned between the frames 60 and 61 is a rectangular frame 66 having a pair of spaced parallel arms 67 and 68. The arms 67 and 68 support therebetween a pinch roller 69 and a drive roller 70 whose shaft 71 is connected coaxially to either of bevel gears 72 and 73 which are rotatably connected to the parallel frame arms 67 and 68, respectively. The bevel gears 72 and 73 mesh with a bevel gear 74 whose hollow shaft 75 is journaled for rotation in the frame 61 and is adapted to be rotated by a belt 76 which is trained around a pulley 77 on and coaxial with the shaft 75 and driven by the drive source through a suitable transmission, not shown, housed also in the base 62. The transmission is arranged to rotate the pulley 77 at speeds different from those of the pulley 64, so that the drive roller 70 can be rotated about its own shaft 71. The filament W passed through the hollow shaft 65 is held in contact with the pinch roller 69 at the front side as viewed in FIG. 1 and is sandwiched between the pinch roller 69 and the drive roller 70. The filament W is then wound around the drive roller 70 from the back of the latter as viewed in FIG. 1 and is passed through the hollow shaft 75 toward the tension-applying unit 13. Thus, rotating the frame 66 enables the filament W to rotate about its own axis at the same rate and in the same direction as the filament W is coiled at a coiling unit, as described later. With the filament W sandwiched between the pinch roller 69 and the drive roller 70 and wound around the latter, the filament W can be prevented from slipping out of driving engagement with these rollers and can be withdrawn positively from the filament supply unit 11.

The tension-applying unit 13 includes a pair of spaced rollers 80 and 81 rotatably mounted on an upper portion of a frame 82 and a tension-applying roller 83 which is movable vertically between an upper and lower limit position later defined. Tension of the filament W is controlled by a weight 84 connected to the tension roller 83. There are also provided a pair of detector switches 85 and 86, such for example as limit switches or photoelectric cells, spaced vertically apart from each other and located between the rollers 80 and 81. The limit switches 85 and 86 are adapted to control the vertical movement of the tension roller 83 therebetween. When the filament drive unit 12 is operated to deliver the filament W at a rate of speed greater than that at which the filament coiling unit 14 draws the filament W, the tension roller 83 moves downwardly into contact with the lower limit switch 86, whereupon the switch 86 controls the drive unit 12 to feed the filament W at a speed slower than that at which the filament is drawn or pulled. Conversely, when the filament W is delivered at a speed lower than the speed of drawing the filament W, the tension roller 83 moves upwardly into contact with the upper limit switch 85, whereupon the drive unit 12 is actuated to feed the monofilament W at a faster speed than the speed of drawing the filament W. The speed of delivering the filament can be adjusted by changing through a suitable clutch the transmission gear ratio of the transmission for rotating the bevel wheel 74 in the filament drive unit 12 or alternatively, by controlling the speed of the motor for the coiling unit 14.

The filament coiling unit 14 essentially comprises a base 90 mounted on the bed 15 and a pair of parallel frames 91 and 92 supported on the base 90 and spaced apart longitudinally of the unit 14. There are provided a pair of concentric wheels 93 and 94 journaled for rotation in the respective frames 91 and 92 and having secured thereto large-diameter pulleys 95 and 96, respectively. The pulleys 95 and 96 are rotated by belts 97 and 98, respectively, which run over respective small-diameter pulleys 99 and 100 driven by a suitable transmission disposed within the base 90. A pair of arms 101 and 102 are connected to the respective wheels 93 and 94 and held in opposed, longitudinally spaced relation. Mounted within an inner frame 103 supported between the arms 101 and 102 is a bobbin 104 around which has been wound a reinforcing cord 105 to be inserted in helically coiled elements 106 formed around a mandrel 107 on a mandrel holder 108 coaxial with the wheel 94. The wheel 94 and the mandrel holder 108 are apertured and the mandrel 107 is grooved to pass the cord 105 therethrough. The wheels 93 and 94 are provided with eccentric sleeves 109 and 110, respectively, extending axially therethrough for the passage of the filament W. The filament W withdrawn from the tension-applying unit 13 is advanced through the sleeve 109, the arms 101 and 102, and the sleeve 110 toward the mandrel 107. As the wheels 93 and 94 are rotated by the belts 97 and 98, respectively, the filament W is wound around the mandrel 107 to form a continuously coiled fastener element 106 which is then introduced to a subsequent finishing station wherein the fastener element is set into final form by heat treatment and etc., as is well known.

Figure 4:
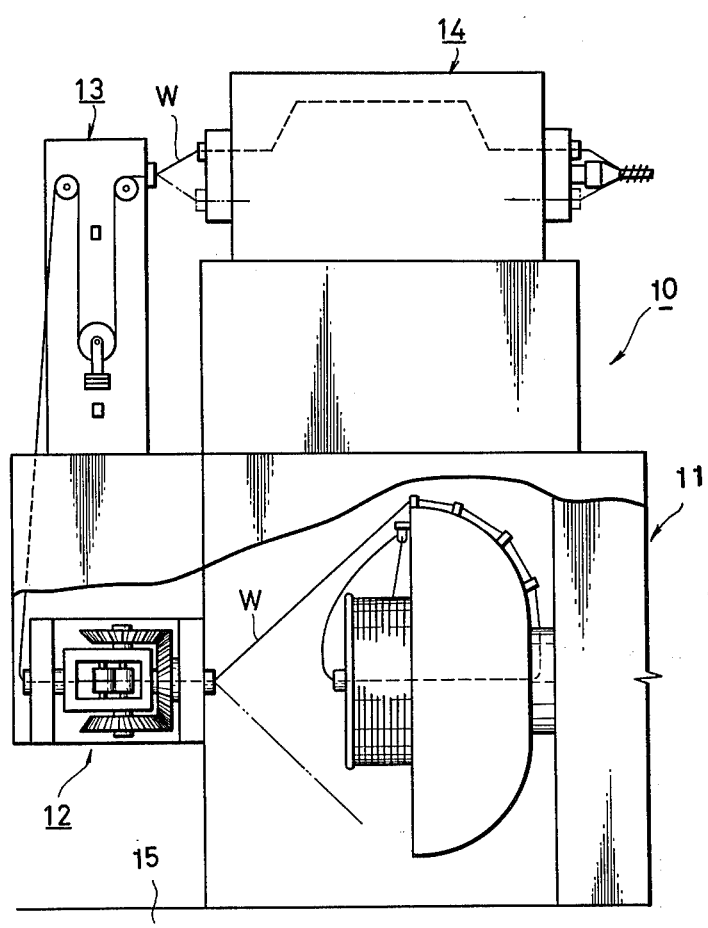
FIG. 4 is a side elevational view with parts cut away of the apparatus with its various component units rearranged to save the floor space.

As shown in FIG. 4, the apparatus 10 may be rearranged with the tension-applying unit 13 and filament coiling unit 14 located above the filament drive unit 12 and the filament supply unit 11, respectively, so that the floor space required for the apparatus can be considerably reduced and the apparatus can be manipulated with greater ease.

OPERATION

As shown in FIG. 1, the wheels 93 and 94 of the filament coiling unit 14 are rotated so as to wind the filament W around the mandrel 107 to provide a helically coiled element structure 106. Simultaneously with this, the filament is withdrawn from the bobbin 29 by the operation of the drive unit 12. The bobbin 29 in the illustrated embodiment is caused to rotate at such a low speed commensurate with the amount of the filament W being withdrawn. The drive shaft 17 rotates the rotor 16 of the filament supply unit 11 in the same direction as the wheels 93, 94 of the filament coiling unit 14 so as to turn the filament W about its own axis at the same rate and in the same direction as the filament W is coiled in the filament coiling unit 14, thereby eliminating twists of the filament W which would otherwise develop under the influence of revolution of the wheel 94 about the mandrel and appear in each convolution of the resulting coiled fastener element 106. As seen in FIG. 1, the filament W is guided through the hole 32 of the arm 26, the passageway 20, the hub 21, and the guide members 35 in a loop fashion, such that half or 180° revolution of the rotor 16 results in one twist of the filament W which is imparted by 360° rotation of the latter about its own axis. Accordingly, it will be appreciated that only half revolution of the rotor 16 can remove one twist of the filament W as will be produced during one revolution of the wheels 93 and 94 of the filament coiling unit 14. In the case of the disclosed embodiment in which the guide member 23 is rotated around the non-rotatable bobbin 29 to unwind the filament W, the filament W is given one twist during one revolution of the guide member 23. However, the extent of twists developed in each element convolution would be reduced and hence negligible.

The rectangular frame 66 of the filament drive unit 12 is rotated by the belt 63 in the same direction as and in synchronous relation with the wheels 93, 94 of the filament coiling unit 14, so that the filament W rotates about its own axis to eliminate the tendency of getting twisted during the filament coiling operation. As stated before, rotation of the drive roller 70 is effected by means of the differences in the number of revolutions between the pulleys 64 and 77, so that the filament W is fed positively to the filament coiling unit 14 through the tension-applying unit 13 interposed therebetween.

What is claimed is:

1. A method of manufacturing a slide fastener element in the form of a continuous helical coil from a plastic filament which comprises supplying a filament from a filament storing means set in place but disposed for free rotation and rotating said filament, while being advanced, on its own axis at the same rate and in the same direction as the filament is coiled at a filament coiling unit.

2. An apparatus for manufacturing a slide fastener element in the form of a continuous helical coil from a plastic filament which comprises a filament supply unit comprising filament storing means set in place but disposed for free rotation and rotating means for guiding and rotating said filament, while being advanced, on its own axis, and a filament coiling unit where the filament is coiled, said filament being rotated on its own axis at the same rate and in the same direction as the filament is coiled at said filament coiling unit.

3. An apparatus as defined in claim 2 wherein said filament supply unit comprises a bracket, a rotor journaled for rotation in said bracket, and a nonrotatable filament guide member having an axially extending passageway and mounted coaxially on said rotor, said rotor and said guide member being adapted to guide the filament from said storing means through said passgeway, and said filament storing means rotating relative to said guide member as the filament is withdrawn.

4. An apparatus for manufacturing a slide fastener element in the form of a continuous helical coil from a plastic filament which comprises a filament supply unit, a filament coiling unit, a filament drive unit interposed between said supply unit and said coiling unit for withdrawing said filament from said filament supply unit and simultaneously rotating said filament at the same rate and in the same direction as said filament is coiled at said filament coiling unit, and a tension-applying unit interposed between said coiling unit and said drive unit for imparting constant tension to the filament being advanced.

5. An apparatus as defined in claim 4 wherein said filament drive unit comprises a rectangular frame having two parallel arms and adapted to rotate about an axis parallel to said arms, a drive roller mounted for rotation between said two arms to drive the filament toward said coiling unit, a first bevel gear connected coaxially to said drive roller, and a second bevel gear engageable with said first gear and rotatable about said parallel axis, and said frame and second bevel gear being rotatable out of synchronism.

6. An apparatus as defined in claim 4 wherein said tension-applying unit comprises a frame, a pair of spaced rollers rotatably mounted on said frame, a tension-applying roller around which is guided the filament depending between said spaced rollers, and a pair of limit switches disposed between said spaced rollers for detecting the vertical movement of said tension-applying roller.

* * * * *